(12) United States Patent
Larose, Jr. et al.

(10) Patent No.: US 9,003,773 B2
(45) Date of Patent: Apr. 14, 2015

(54) VEHICLE AND A METHOD OF UPDATING AGING OF A SELECTIVE CATALYTIC REDUCTION FILTER OF AN EXHAUST TREATMENT SYSTEM OF THE VEHICLE

(71) Applicant: GM Global Technology Operations LLC, Detroit, MI (US)

(72) Inventors: Thomas Larose, Jr., Howell, MI (US); Christopher Whitt, Howell, MI (US); Christopher C. Swoish, Lapeer, MI (US); Joshua Clifford Bedford, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 72 days.

(21) Appl. No.: 13/967,747

(22) Filed: Aug. 15, 2013

(65) Prior Publication Data

US 2015/0047320 A1    Feb. 19, 2015

(51) Int. Cl.
*F01N 3/035* (2006.01)
*F01N 3/021* (2006.01)

(52) U.S. Cl.
CPC ..................... *F01N 3/021* (2013.01)

(58) Field of Classification Search
USPC ............ 60/274, 277, 286, 295, 297, 301, 311
See application file for complete search history.

(56) References Cited

U.S. PATENT DOCUMENTS

| 7,758,676 | B2 | 7/2010 | Mital et al. |
| 8,141,340 | B2 | 3/2012 | Garimella et al. |
| 2014/0182270 | A1* | 7/2014 | Jun ................................. 60/274 |

* cited by examiner

*Primary Examiner* — Thomas Denion
*Assistant Examiner* — Jorge Leon, Jr.
(74) *Attorney, Agent, or Firm* — Quinn Law Group, PLLC

(57) ABSTRACT

A vehicle and method of updating aging of a selective catalytic reduction filter (SCRF) of an exhaust treatment system of the vehicle are disclosed. The method includes determining a desorption rate estimate of a catalyst of the SCRF and determining an ash volume estimate representative of an amount of ash collected inside the SCRF. The method also includes determining an ash correction factor from the ash volume estimate and calculating, via a controller, a corrected desorption rate value by multiplying the ash correction factor with the desorption rate estimate to update the aging of the SCRF.

30 Claims, 1 Drawing Sheet

VEHICLE AND A METHOD OF UPDATING AGING OF A SELECTIVE CATALYTIC REDUCTION FILTER OF AN EXHAUST TREATMENT SYSTEM OF THE VEHICLE

TECHNICAL FIELD

The present disclosure relates to a vehicle and a method of updating aging of a selective catalytic reduction filter of an exhaust treatment system of the vehicle.

BACKGROUND

Internal combustion engines can produce byproducts of the fuel combustion process, including various oxides of nitrogen, referred to collectively herein as NOx gases. Exhaust gas treatment systems can be used in vehicles to treat the NOx gases created in the combustion process.

Exhaust gas treatment systems generally include a selective catalytic reduction (SCR) device to reduce NOx gases. The SCR device uses a reductant capable of reacting with NOx gases to convert the NOx gases into inert byproducts, i.e., nitrogen and water. For example, the reductant can be an aqueous solution of urea, which is injected into the engine's exhaust stream. Once the reductant is in the exhaust stream, the reductant is absorbed into a catalyst of the SCR device, where the catalytic action of the SCR device ultimately converts NOx gases into the inert byproducts.

Exhaust gas treatment systems also include a diesel particulate filter (DPF) to filter out particles or particulate matter in the exhaust stream that is emitted by the engine. Generally, the DPF captures or traps sooty particulate matter and other suspended particulate matter from the exhaust stream. For example, the particulate matter can include carbonaceous soot particulates that can be oxidized to produce gaseous carbon dioxide, as well as other non-combustible particulates (i.e., ash) that are not capable of being oxidized.

Generally, the SCR device is spaced from the DPF such that the SCR device and the DPF are separate and independent components. Therefore, the SCR device converts NOx gases into the inert byproducts independently of the particulate matter being trapped by the DPF.

In-situ thermal regeneration of the DPF can be conducted periodically to burn off the accumulated particulate matter. However, thermal regeneration cannot remove ash from the DPF, and therefore, ash continues to accumulate in the DPF throughout the life of the DPF.

SUMMARY

The present disclosure provides a method of updating aging of a selective catalytic reduction filter (SCRF) of an exhaust treatment system of a vehicle. The method includes determining a desorption rate estimate of a catalyst of the SCRF and determining an ash volume estimate representative of an amount of ash collected inside the SCRF. The method also includes determining an ash correction factor from the ash volume estimate and calculating, via a controller, a corrected desorption rate value by multiplying the ash correction factor with the desorption rate estimate to update the aging of the SCRF.

The present disclosure also provides a vehicle including an engine that generates an exhaust stream during operation and an exhaust treatment system coupled to the engine. The exhaust treatment system includes a selective catalytic reduction filter (SCRF) to catalytically convert constituents in the exhaust stream into inert byproducts and to filter particulate matter from the exhaust stream. The exhaust treatment system also includes a controller in communication with the SCRF. The controller includes a processor and a memory having recorded instructions for updating aging of the SCRF of the exhaust treatment system. The controller is configured to determine a desorption rate estimate of a catalyst of the SCRF and determine an ash volume estimate representative of an amount of ash collected inside the SCRF. The controller is also configured to determine an ash correction factor from the ash volume estimate and calculate a corrected desorption rate value by multiplying the ash correction factor with the desorption rate estimate to update the aging of the SCRF.

Therefore, ash accumulation is taken into consideration to update the aging of the SCRF and thus optimize the exhaust treatment system. By accounting for ash accumulation in the SCRF, various models can be more accurately calibrated. Furthermore, accounting for ash can optimize diagnostics and fuel economy of the vehicle.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
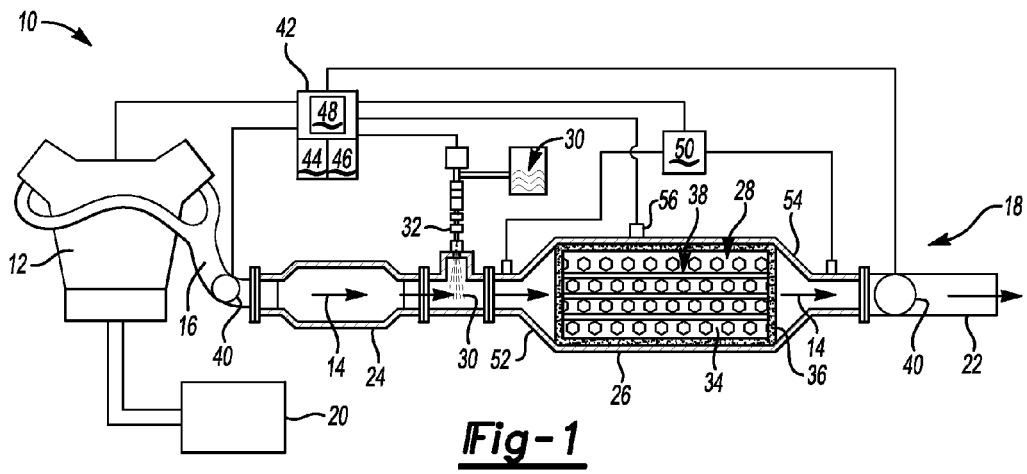
FIG. 1 is a schematic illustration of a vehicle including an engine and an exhaust treatment system.

Referring to the Figures, wherein like numerals indicate like or corresponding parts throughout the several views, a vehicle 10 is generally shown in FIG. 1. The vehicle 10 includes an engine 12 that generates an exhaust stream (arrow 14) during operation. The engine 12 can be an internal combustion engine such as diesel engine or any other engine that emits gases, such as oxides of nitrogen (NOx), i.e., NOx gases, into the exhaust stream 14. An exhaust gas tube 16 is coupled to the engine 12 and receives the exhaust gas from the engine 12 such that the exhaust stream 14 moves through the exhaust gas tube 16. While a diesel engine application is described hereinafter for illustrative purposes only, those skilled in the art will appreciate that a similar approach can be taken with other engine designs.

The vehicle 10 includes an exhaust treatment system 18 coupled to the engine 12. The exhaust treatment system 18 treats various constituents in the exhaust gas such as NOx gases. In other words, the exhaust treatment system 18 treats various emissions contained in the exhaust stream 14 expelled from the engine 12.

As shown in FIG. 1, the vehicle 10 includes a tank 20 for storing fuel, such as, for example, diesel fuel. The diesel fuel is drawn from the tank 20 and combusted in the engine 12 which generates the exhaust stream 14, and the exhaust stream 14 is then processed through the exhaust treatment system 18 before being expelled from a tailpipe 22.

The exhaust system 18 includes a series of exhaust aftertreatment devices 24, 26, shown in FIG. 1 as an oxidation catalyst 24, such as a diesel oxidation catalyst 24 (DOC), and a selective catalyst reduction filter 26 (SCRF) which are each discussed in detail below. Accordingly, the exhaust gas tube 16 directs the exhaust gas stream 14 from the engine 12 through the series of exhaust after-treatment devices 24, 26. Depending on the embodiment, the after-treatment devices 24, 26 of the exhaust system 18 can be arranged in other orders than shown in FIG. 1. Collectively, the DOC 24 and the SCRF 26 condition the exhaust stream 14.

As discussed above, the exhaust after-treatment devices 24, 26 are utilized to reduce various exhaust emissions of the engine 12. For example, the DOC 24 receives the exhaust gas stream 14 from the engine 12 to oxidize and burn hydrocarbon emissions present in the exhaust stream 14. The DOC 24 is in communication with a fuel injection device that delivers a calibrated amount of fuel into the DOC 24. Ignition of the injected fuel rapidly increases the temperature of the exhaust stream 14, generally 600° C. (Celsius) or higher, in order to enable a thermal regeneration of the SCRF 26.

In one example, following the DOC 24, the exhaust stream 14 is routed to the SCRF 26. In other words, the SCRF 26 is disposed downstream to the DOC 24. Generally, the SCRF 26 catalytically converts constituents in the exhaust stream 14 into inert byproducts and filters particulate matter from the exhaust stream 14. In other words, the SCRF 26 treats various emissions contained in the exhaust stream 14 and also filters particulate matter, such as soot and ash, from the exhaust stream 14. Therefore, generally, the SCRF 26 performs multiple functions, such as, treating NOx gases and filtering soot and ash from the exhaust stream 14 (each of which are discussed in turn below). Simply stated, SCRF 26 is utilized to reduce NOx emissions and particulate matter expelled from the engine 12 powering the vehicle 10.

Continuing with FIG. 1, the SCRF 26 includes an active catalytic component 28, referred to herein as a catalyst 28. The catalyst 28 can be an oxide of a base metal such as vanadium, molybdenum, tungsten and zeolite. A reductant 30 is utilized to convert NOx gases into inert byproducts. As such, the SCRF 26 is converting NOx gases with the aid of the catalyst 28 into inert byproducts, i.e., diatomic nitrogen $N_2$, and water $H_2O$. The reductant 30 can be anhydrous ammonia, aqueous ammonia, ammonia precursors, aqueous solution of urea or any other suitable reductant 30, which is added to the exhaust stream 14 and absorbed in the SCRF 26. An injector 32 (see FIG. 1) or any other suitable device can be utilized to add the reductant 30 to the exhaust stream 14.

Exhaust emissions of both gasoline engines 12 and diesel engines 12 can be optimized by utilizing the SCRF 26. For the diesel engine embodiment, the reductant 30 can be a diesel-exhaust-fluid (DEF) that is used in the SCRF 26. Accordingly, the DEF is disposed on the catalyst 28 of the SCRF 26 as the exhaust gas stream 14 flows through the SCRF 26.

Referring to FIG. 1, the SCRF 26 can include a carrier or substrate 34 that is dipped into a washcoat 36 containing the active catalytic component 28, i.e., the catalyst 28. Generally, the washcoat 36 is applied to or coated on a surface of the substrate 34 for absorbing the reductant 30. More specifically, the substrate 34 is porous and the washcoat 36 is applied or coated on the surface of the substrate 34 within the pores. The substrate 34 can be a ceramic brick or a ceramic honeycomb structure, a plate structure, or any other suitable structure. In other words, the washcoat 36 can be applied to the surface of the pores of the ceramic brick. For example, the substrate 34 can be formed of silicon carbide (SiC), cordierite or any other suitable substrate being highly porous. The washcoat 36 attracts the reductant 30 to deposit the reductant 30 in the SCRF 26. In other words, the reductant 30 is disposed on the washcoat 36 inside the SCRF 26. As the exhaust stream 14 passes through the SCRF 26, the reductant 30 interacts with the exhaust gas stream 14 to generate a chemical reaction which reduces NOx gases passing through the exhaust system 18.

As the exhaust gas stream 14 passes through the SCRF 26, the particulate matter emitted from the engine 12 is collected in the SCRF 26. Therefore, the SCRF 26 can include a filter 38 (see FIG. 1) for collecting the particulate matter. As such, for example, the filter 38 of the SCRF 26 collects sooty particulate matter during a soot loading phase and disposes of the sooty particulate matter through the regeneration process. Generally, carbonaceous soot particulates can be oxidized during the regeneration process to produce gaseous carbon dioxide. In-situ thermal regeneration of the SCRF 26 can be conducted periodically to burn off accumulated sooty particulate matter.

Furthermore, as the exhaust gas stream 14 passes through the SCRF 26, the SCRF 26 collects other non-combustible particulates (i.e., ash) emitted from the engine 12. In other words, the filter 38 of the SCRF 26 collects particulate matter such as ash. For example, ash can form as a result of oil being burned during the engine combustion process. However, the other non-combustible particulates, such as ash, are not capable of being oxidized during the regeneration process. Specifically, ash continues to accumulate in the filter 38 of the SCRF 26 throughout the life of the SCRF 26. In other words, ash cannot be removed from the SCRF 26 unless the SCRF 26 is removed from the vehicle 10. Therefore, ash builds inside the SCRF 26 throughout the life of the SCRF 26. As the ash builds inside the filter 38, the ash can accumulate on the surface of the substrate 34, thus reducing the area of the washcoat 36 to react with the reductant 30. Therefore, the efficiency of the SCRF 26 can be degraded due to an amount of ash accumulation on the SCRF 26. In other words, ash can build inside the SCRF 26 which can degrade the efficiency of the SCRF 26.

Continuing with FIG. 1, the exhaust system 18 can further include at least one NOx sensor 40. In one embodiment, the NOx sensor 40 can be positioned upstream to the SCRF 26. For example, the NOx sensor 40 can be positioned upstream to the DOC 24 and the SCRF 26 such that the NOx sensor 40 is disposed between the engine 12 and the DOC 24. As another example, the NOx sensor 40 can be positioned upstream to the SCRF 26 such that the NOx sensor 40 is disposed between the DOC 24 and the SCRF 26. In another embodiment, the NOx sensor 40 can be positioned downstream to the SCRF 26. For example, the NOx sensor 40 can be positioned between the SCRF 26 and the tailpipe 22. In another embodiment, the NOx sensor 40 can be defined as a plurality of NOx sensors 40, with one of the NOx sensors 40 positioned upstream to the DOC 24 and another one of the NOx sensors 40 positioned downstream to the SCRF 26. Structurally and functionally, the NOx sensors 40 can be different or identical.

The exhaust system 18 can further include a controller 42 (see FIG. 1) in communication with various components of the vehicle 10. For example, the controller 42 is in communication with the SCRF 26. As another example, the controller 42 can be in communication with each of the NOx sensors 40. Therefore, the NOx sensors 40 can send or communicate NOx level measurements to the controller 42. The controller 42 can be a stand-alone unit, or be part of an electronic controller that regulates the operation of the engine 12. The controller 42 can include a processor 44 and a memory 46 having recorded instructions for updating aging of the SCRF 26 of the exhaust treatment system 18, as discussed further below. For example, the controller 42 can be a host machine or distributed system, e.g., a computer such as a digital computer or microcomputer, acting as a vehicle control module, and/or as a proportional-integral-derivative (PID) controller device having a processor, and tangible, non-transitory memory such as read-only memory (ROM) or flash memory. The controller 42 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 42 can include all software, hardware, memory 46, algorithms, connections, sensors, etc., necessary to monitor and control the exhaust treatment system 18 and the engine 12. As such, a control method operative to evaluate and update an SCRF aging model 48 can be embodied as software or firmware associated with the controller 42. Furthermore, the control method operative to evaluate and initiate a regeneration can be embodied as software or firmware associated with the controller 42. It is to be appreciated that the controller 42 can also include any device capable of analyzing data from various sensors, comparing data, making the necessary decisions required to control and monitor the exhaust treatment system 18.

Furthermore, the exhaust system 18 can include a particulate filter sensor 50 (see FIG. 1) that measures the differential pressure across the SCRF 26. Generally, the controller 42 can be in communication with the particulate filter sensor 50. Therefore, the particulate filter sensor 50 can send or communicate the pressure difference across the SCRF 26. The particulate filter sensor 50 measures and calculates the pressure differential between an inlet side 52 and an outlet side 54 of the SCRF 26. The particulate filter sensor 50 can be a unitary sensor or gauge connected to the SCRF 26. Alternatively, the particulate filter sensor 50 can be embodied as a pair of pressure taps that individually read the inlet and outlet pressures, and then calculates the differential pressure across the SCRF 26. The particulate filter sensor 50 can return a resultant measurement to the controller 42.

Additionally, the exhaust system 18 can include a temperature sensor 56 (see FIG. 1) that measures a temperature 58 (see FIG. 2) of the substrate 34 of the SCRF 26. Generally, the controller 42 can be in communication with the temperature sensor 56. Therefore, the temperature sensor 56 can send or communicate the temperature 58 of the substrate 34 to the controller 42. It is to be appreciated that more than one temperature sensor 56 can be utilized with the exhaust system 18.

After the exhaust gas stream 14 exits the SCRF 26, the exhaust stream 14 passes through the tailpipe 22. In other words, the tailpipe 22 is disposed downstream of the SCRF 26. In one embodiment, the SCRF 26 is disposed between the DOC 24 and the tailpipe 22.

Various inputs can be communicated to and from the controller 42. These inputs can be inputted into the SCRF aging model 48 within the controller 42. For example, the SCRF aging model 48 can be utilized to update the aging of the SCRF 26. Therefore, various information is relayed to the controller 42 which can be utilized for the SCRF aging model 48. The addition of the washcoat 36 to the filter 38 of the SCRF 26 adds an extra source of variation to be accounted for to determine the aging of the SCRF 26. As such, as ash collects inside the SCRF 26, the area of the surface (of the substrate 34) presenting the catalyst 28 that absorbs the reductant 30 is reduced. In other words, as the ash collects inside the SCRF 26, some of the washcoat 36 (including the catalyst 28) is covered by the ash which decreases the area of the washcoat 36 being able to absorb the reductant 30. Accordingly, the operating efficiency of the SCRF 26 decreases, and thus the SCRF aging model 48 captures reduction in performance of the SCRF 26 when ash accumulates inside the SCRF 26.

Figure 3:
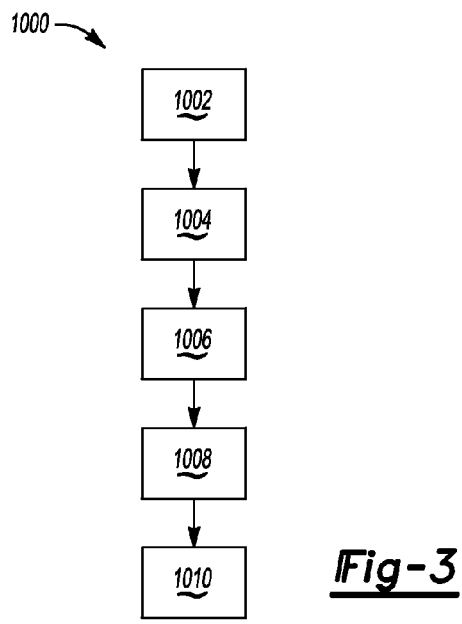
FIG. 3 is a schematic flowchart of a method of updating aging of a SCRF of the exhaust treatment system of the vehicle.

A desorption rate of the catalyst 28 can be determined by the controller 42 as ash collects inside the SCRF 26 and the amount of the washcoat 36 being able to absorb the reductant 30 decreases. Therefore, ash accumulation is taken into consideration to update the aging of the SCRF 26 and thus optimize the exhaust treatment system 18. Referring to FIG. 3, the present disclosure also provides a method 1000 of updating aging of the SCRF 26 of the exhaust treatment system 18 of the vehicle 10. In other words, the aging of the SCRF 26 of the exhaust treatment system 18 can be updated utilizing this method 1000. By updating the aging of the SCRF 26, other models accounting for the age of the SCRF 26 can also be optimized. Specifically, by accounting for ash accumulation in the SCRF 26, various models can be more accurately calibrated. Furthermore, by updating the aging of the SCRF 26, the amount of reductant 30 being passed into the exhaust stream 14 can be more accurately adjusted to ultimately minimize NOx gases from being discharged out the tailpipe 22.

Figure 2:
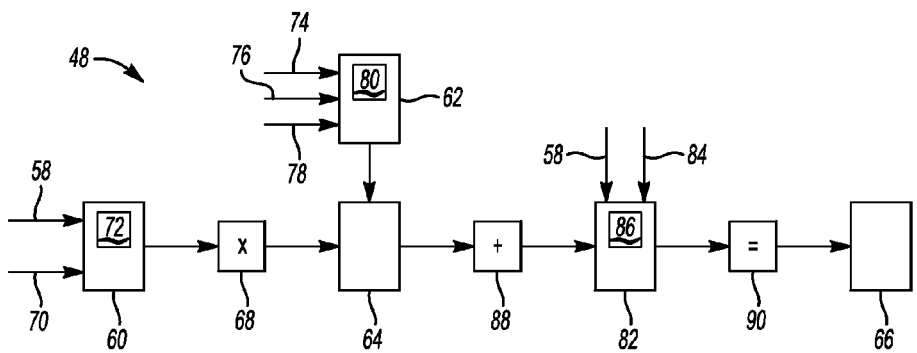
FIG. 2 is a schematic diagram of a selective catalytic reduction filter (SCRF) aging model.

Referring to FIGS. 2 and 3, the method 1000 includes determining 1002 a desorption rate estimate 60 of the catalyst 28 of the SCRF 26 and determining 1004 an ash volume estimate 62 representative of the amount of ash collected inside the SCRF 26. The method 1000 also includes determining 1006 an ash correction factor 64 from the ash volume estimate 62 and calculating 1008, via the controller 42, a corrected desorption rate value 66 by multiplying (box 68) the ash correction factor 64 with the desorption rate estimate 60 to update the aging of the SCRF 26. FIG. 2 is a schematic representation of the ash correction factor 64 multiplied by (box 68) the desorption rate estimate 60.

The desorption rate estimate 60 can be determined by utilizing various inputs. One input that can be utilized is the temperature 58 of the substrate 34 of the SCRF 26. Another input that can be utilized is a loading estimate 70 of the reductant 30 on the substrate 34. Said differently, the loading estimate 70 is the estimated amount of the reductant 30 being disposed on the substrate 34. In certain embodiments, determining 1002 the desorption rate estimate 60 of the catalyst 28 can include obtaining the temperature 58 of the substrate 34 of the SCRF 26. Furthermore, in certain embodiments, determining 1002 the desorption rate estimate 60 of the catalyst 28 can include determining the loading estimate 70 of the reductant 30 on the substrate 34. Therefore, determining 1002 the desorption rate estimate 60 can include selecting a first numeric value from a desorption rate map 72 based on the temperature 58 of the substrate 34 and the loading estimate 70 of the reductant 30 on the substrate 34. It is to be appreciated that other inputs can be utilized to determine the desorption rate estimate 60, such as for example, pressures, NOx levels, the total miles the vehicle 10 has traveled, time, etc. Furthermore, it is to be appreciated that the one or a combination of more than one of the loading estimate 70, the temperature 58 of the substrate 34, etc., can be utilized to determine the desorption rate estimate 60. It is to be appreciated that the desorption rate map 72 can be populated using numeric data obtained either through empirical testing or through analytic formulation.

Additionally, the ash volume estimate 62 can be determined by utilizing various inputs. One of the inputs can be an amount of fuel consumption 74 in the engine 12. Another one of the inputs can be an amount of oil burned 76 in the engine 12. Yet another one of the inputs can be a total number 78 of thermal regenerations performed on the SCRF 26. As such, in certain embodiments, determining 1004 the ash volume estimate 62 can include determining the amount of fuel consumption 74 in the engine 12 of the vehicle 10. Furthermore, in certain embodiments, determining 1004 the ash volume estimate 62 can include determining the amount of oil burned 76 in the engine 12 of the vehicle 10. Additionally, in certain embodiments, determining 1004 the ash volume estimate 62 can include obtaining the total number 78 of thermal regenerations performed on the SCRF 26. It is to be appreciated that other inputs can be utilized to determine the ash volume estimate 62, such as for example, pressures, NOx levels, the total miles the vehicle 10 has traveled, time, weight changes of the SCRF 26 over the lifetime of the SCRF 26, etc. Furthermore, it is to be appreciated that the one or a combination of more than one of the amount of fuel consumption 74, the amount of oil burned 76, the total number 78 of thermal regenerations, etc., can be utilized to determine the ash volume estimate 62.

Generally, the ash correction factor 64 is a second numeric value of less than 1.0. Therefore, determining 1006 the ash correction factor 64 can include selecting the second numeric value from a look-up table 80. The look-up table 80 expresses the ash correction factor 64 as a function of the ash volume estimate 62. Furthermore, the ash correction factor 64 decreases as the amount of ash increases inside the SCRF 26. In certain embodiments, the ash volume estimate 62 can be a value expressed in grams of ash.

The method 1000 can further include determining 1010 an aged correction estimate 82 of the SCRF 26. The aged correction estimate 82 can be determined by utilizing various inputs. One of the inputs can be a usage time 84 of the SCRF 26. Another one of the inputs can be the temperature 58 of the substrate 34 of the SCRF 26. Therefore, in certain embodiments, determining 1010 the aged correction estimate 82 of the SCRF 26 can include obtaining the usage time 84 of the SCRF 26. In addition, in certain embodiments, determining 1010 the aged correction estimate 82 of the SCRF 26 can include obtaining the temperature 58 of the substrate 34 of the SCRF 26. It is to be appreciated that other inputs can be utilized to determine the aged correction estimate 82 such as for example, pressures, NOx levels, the total miles the vehicle 10 has traveled, time, etc. Furthermore, it is to be appreciated that the one or a combination of more than one of the usage time 84 of the SCRF 26, the temperature 58 of the substrate 34 of the SCRF 26, etc., can be utilized to determine the aged correction estimate 82.

Therefore, determining 1010 the aged correction estimate 82 can include selecting a third numeric value from a correction map 86 based on the usage time 84 and the temperature 58 of the substrate 34. As such, calculating 1008 the corrected desorption rate value 66 can include calculating the corrected desorption rate value 66 by multiplying (box 68) the ash correction factor 64 with the desorption rate estimate 60 and then adding (box 88) the aged correction estimate 82 to update the aging of the SCRF 26. FIG. 2 is a schematic representation of the ash correction factor 64 multiplied by (box 68) the desorption rate estimate 60 and then adding (box 88) the aged correction estimate 82 to equal (box 90) the corrected desorption rate value 66 to update aging of the SCRF 26. The controller 42 is configured to calculate the corrected desorption rate value 66 and therefore, the controller 42 can store, evaluate, determine, etc., various information, as discussed above, to update aging of the SCRF 26. It is to be appreciated that the correction map 86 can be populated using numeric data obtained either through empirical testing or through analytic formulation.

It is to be appreciated that the order or sequence of performing the method 1000 as identified in the flowchart of FIG. 3 is for illustrative purposes and other orders or sequences are within the scope of the present disclosure. It is to also be appreciated that the method 1000 can include other features not specifically identified in the flowchart of FIG. 3.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of updating aging of a selective catalytic reduction filter (SCRF) of an exhaust treatment system of a vehicle, the method comprising:
    determining a desorption rate estimate of a catalyst of the SCRF;
    determining an ash volume estimate representative of an amount of ash collected inside the SCRF;
    determining an ash correction factor from the ash volume estimate; and
    calculating, via a controller, a corrected desorption rate value by multiplying the ash correction factor with the desorption rate estimate to update the aging of the SCRF;
    adjusting an amount of reductant being passed into an exhaust stream based on the updated aging of the SCRF.

2. A method as set forth in claim 1 wherein determining the desorption rate estimate of the catalyst includes obtaining a temperature of a substrate of the SCRF.

3. A method as set forth in claim 2 wherein determining the desorption rate estimate of the catalyst includes determining a loading estimate of the reductant on the substrate.

4. A method as set forth in claim 3 wherein determining the desorption rate estimate includes selecting a first numeric value from a desorption rate map based on the temperature of the substrate and the loading estimate of the reductant on the substrate.

5. A method as set forth in claim 1 wherein the ash correction factor is a second numeric value of less than 1.0.

6. A method as set forth in claim 5 wherein determining the ash correction factor includes selecting the second numeric value from a look-up table, with the look-up table expressing the ash correction factor as a function of the ash volume estimate.

7. A method as set forth in claim 6 wherein the ash correction factor decreases as the amount of ash increases inside the SCRF.

8. A method as set forth in claim 1 further comprising determining an aged correction estimate of the SCRF.

9. A method as set forth in claim 8 wherein calculating the corrected desorption rate value includes calculating the corrected desorption rate value by multiplying the ash correction factor with the desorption rate estimate and then adding the aged correction estimate to update the aging of the SCRF.

10. A method as set forth in claim 9 wherein determining the aged correction estimate of the SCRF includes obtaining a usage time of the SCRF.

11. A method as set forth in claim 10 wherein determining the aged correction estimate of the SCRF includes obtaining a temperature of a substrate of the SCRF.

12. A method as set forth in claim 11 wherein determining the aged correction estimate includes selecting a third numeric value from a correction map based on the usage time and the temperature of the substrate.

13. A method as set forth in claim 1 wherein determining the ash volume estimate includes determining an amount of fuel consumption in an engine of the vehicle.

14. A method as set forth in claim 1 wherein determining the ash volume estimate includes determining an amount of oil burned in an engine of the vehicle.

15. A method as set forth in claim 1 wherein determining the ash volume estimate includes obtaining a total number of thermal regenerations performed on the SCRF.

16. A vehicle comprising:
an engine that generates an exhaust stream during operation;
an exhaust treatment system coupled to the engine and including:
a selective catalytic reduction filter (SCRF) to catalytically convert constituents in the exhaust stream into inert byproducts and to filter particulate matter from the exhaust stream;
a controller in communication with the SCRF, with the controller including a processor and a memory having recorded instructions for updating aging of the SCRF of the exhaust treatment system, wherein the controller is configured to:
determine a desorption rate estimate of a catalyst of the SCRF;
determine an ash volume estimate representative of an amount of ash collected inside the SCRF;
determine an ash correction factor from the ash volume estimate; and
calculate a corrected desorption rate value by multiplying the ash correction factor with the desorption rate estimate to update the aging of the SCRF;
adjust an amount of reductant being passed into the exhaust stream based on the updated aging of the SCRF.

17. A vehicle as set forth in claim 16 wherein the controller is configured to determine the desorption rate estimate of the catalyst by obtaining a temperature of a substrate of the SCRF.

18. A vehicle as set forth in claim 17 wherein the controller is configured to determine the desorption rate estimate of the catalyst by determining a loading estimate of the reductant on the substrate.

19. A vehicle as set forth in claim 18 wherein the controller is configured to determine the desorption rate estimate by selecting a first numeric value from a desorption rate map based on the temperature of the substrate and the loading estimate of the reductant on the substrate.

20. A vehicle as set forth in claim 16 wherein the ash correction factor is a second numeric value of less than 1.0.

21. A vehicle as set forth in claim 20 wherein the controller is configured to determine the ash correction factor by selecting the second numeric value from a look-up table, with the look-up table expressing the ash correction factor as a function of the ash volume estimate.

22. A vehicle as set forth in claim 21 wherein the ash correction factor decreases as the amount of ash increases inside the SCRF.

23. A vehicle as set forth in claim 16 wherein the controller is configured to determine an aged correction estimate of the SCRF.

24. A vehicle as set forth in claim 23 wherein the controller is configured to calculate the corrected desorption rate value is further defined as the controller is configured to calculate the corrected desorption rate value by multiplying the ash correction factor with the desorption rate estimate and then adding the aged correction estimate to update the aging of the SCRF.

25. A vehicle as set forth in claim 24 wherein the controller is configured to determine the aged correction estimate of the SCRF by obtaining a usage time of the SCRF.

26. A vehicle as set forth in claim 25 wherein the controller is configured to determine the aged correction estimate of the SCRF by obtaining a temperature of a substrate of the SCRF.

27. A vehicle as set forth in claim 26 wherein the controller is configured to determine the aged correction estimate by selecting a third numeric value from a correction map based on the usage time of the SCRF and the temperature of the substrate of the SCRF.

28. A vehicle as set forth in claim 16 wherein the controller is configured to determine the ash volume estimate by determining an amount of fuel consumption in an engine of the vehicle.

29. A vehicle as set forth in claim 16 wherein the controller is configured to determine the ash volume estimate by determining an amount of oil burned in an engine of the vehicle.

30. A vehicle as set forth in claim 16 wherein the controller is configured to determine the ash volume estimate by obtaining a total number of thermal regenerations performed on the SCRF.

* * * * *